No. 828,200. PATENTED AUG. 7, 1906.
J. M. DODGE.
SPROCKET WHEEL FOR TOOTHED DRIVE CHAINS.
APPLICATION FILED APR. 21, 1905.
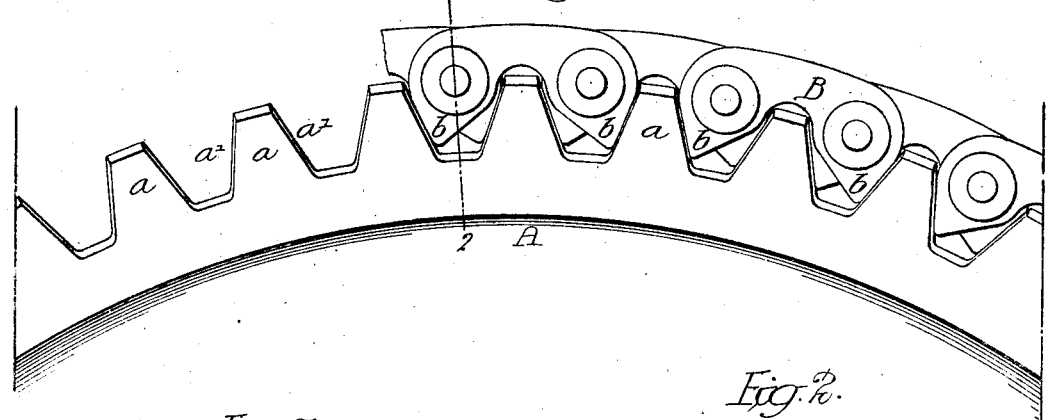
Fig. 1.
Fig. 2.
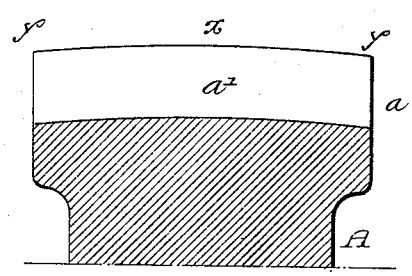
Fig. 3.
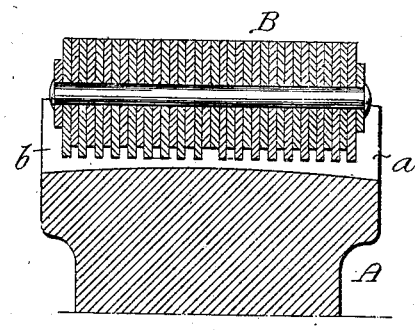
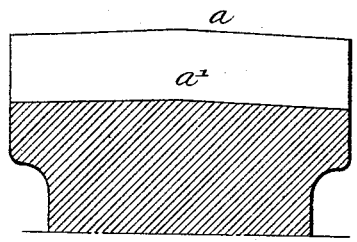
Fig. 5.
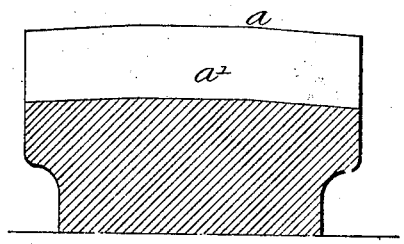
Fig. 6.
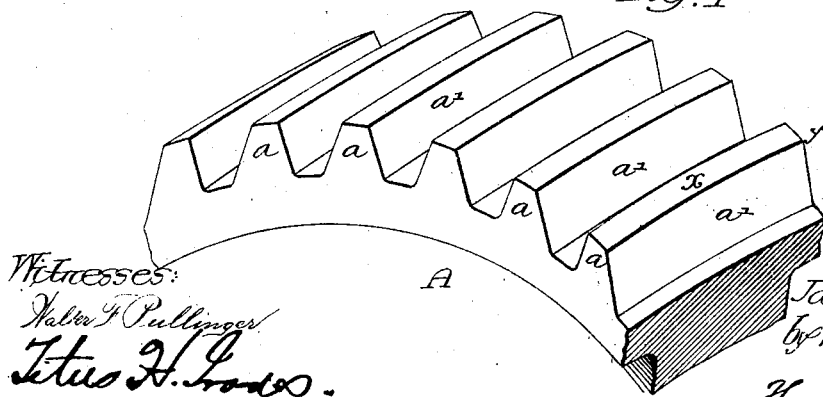
Fig. 4.
Witnesses:
Walter T. Pullinger
Titus H. Trodex
Inventor:
James M. Dodge
by his Attorneys
Howson & Howson

UNITED STATES PATENT OFFICE.

JAMES M. DODGE, OF PHILADELPHIA, PENNSYLVANIA.

SPROCKET-WHEEL FOR TOOTHED DRIVE-CHAINS.

No. 828,200.      Specification of Letters Patent.      Patented Aug. 7, 1906.

Application filed April 21, 1905. Serial No. 256,750.

*To all whom it may concern:*

Be it known that I, JAMES M. DODGE, a citizen of the United States, residing in Philadelphia, Pennsylvania, have invented certain Improvements in Sprocket-Wheels for Toothed Drive-Chains, of which the following is a specification.

The object of my invention is to so construct a sprocket-wheel for a toothed drive-chain that the chain will remain central upon the sprocket-wheel without depending upon side flanges heretofore used. This object I attain in the following manner, reference being had to the accompanying drawings, in which—

Figure 1 is a side view of sufficient of a sprocket-wheel to illustrate my invention, showing a drive-chain mounted on part of the wheel. Fig. 2 is a section on the line 2 2, Fig. 1, showing the chain in position. Fig. 3 is a similar view with the chain removed. Fig. 4 is a perspective view of a portion of the wheel, and Figs. 5 and 6 are views of modifications of the invention.

A is the sprocket-wheel having teeth $a$.

B is a chain made up of a series of link elements placed side by side and one set of link elements alternating with another, the link elements being connected together by pivots forming a flexible endless drive-chain. Each link element has teeth $b$ at each end in the present instance, which bear upon the surfaces $a'$ of the teeth $a$.

Heretofore it has always been deemed necessary to provide some positive means to prevent lateral displacement of the chain upon the sprocket-wheel and side flanges have usually been resorted to for this purpose, although in some instances a central flange has been used which enters the space between the link elements of the chain. The sprocket-wheels have heretofore been flat.

As illustrated in Figs. 1 and 3, I slightly crown the sprocket-wheel, the wheel being higher at the center $x$ than at the edges $y$ $y$, Fig. 3, and this crowning is done by cutting the tooth on a curved line, so that the bearing-face $a'$ of each tooth is curved, as well as the end of each tooth and the base of the space between the teeth, and when the chain engages the wheel there is enough play in the chain to allow the teeth of the link elements to seat themselves snugly against the curved bearing-faces of the teeth of the sprocket-wheel, so that the chain will be kept in the central position upon the sprocket-wheel, dispensing with the usual side or central flanges.

While I prefer to make the teeth curved, as illustrated in Figs. 1 and 3, the teeth may be crowned, as illustrated in Fig. 5, being beveled at each side, or, as in Fig. 6, with a flat center and beveled at each side.

I claim as my invention—

1. The combination of a sprocket-wheel having teeth cut on a curve so as to make the teeth higher at the center than at the edges thus crowning the side bearing-surfaces of the teeth, with a chain made up of a series of link elements having teeth bearing only against the side bearing-surfaces of the teeth, whereby the crowning of the teeth will hold the chain in the central position upon the sprocket-wheel, substantially as described.

2. The combination of a sprocket-wheel having teeth higher at the center than at the edges, thus crowning the side bearing-surfaces of the teeth, with a chain made up of a series of link elements having teeth bearing only against the side bearing-surfaces of the teeth of the wheel, whereby the crowning of the teeth will hold the chain in the central position upon the sprocket-wheel, substantially as described.

In testimony whereof I have signed my name to this specification in the presence of two subscribing witnesses.

JAMES M. DODGE.

Witnesses:
WILL. A. BARR,
WM. E. SHUPE.